US012700099B2

(12) United States Patent
Martinez Lopez et al.

(10) Patent No.: US 12,700,099 B2
(45) Date of Patent: Aug. 4, 2026

(54) SEGMENTING FOOD ITEMS FROM BACKGROUND IN A COOKING APPARATUS

(71) Applicant: Samsung Electronics Co., Ltd., Suwon-si (KR)

(72) Inventors: Pedro Martinez Lopez, Mountain View, CA (US); Brian Patton, San Francisco, CA (US); Nigel Clarke, Mountain View, CA (US); William Augustus Workman, San Francisco, CA (US); Megan Rowe, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/983,242

(22) Filed: Nov. 8, 2022

(65) Prior Publication Data

US 2024/0153092 A1    May 9, 2024

Related U.S. Application Data

(60) Provisional application No. 63/418,415, filed on Oct. 21, 2022.

(51) Int. Cl.
*G06T 7/10* (2017.01)
*G06T 7/11* (2017.01)
*G06V 20/68* (2022.01)

(52) U.S. Cl.
CPC ............... *G06T 7/10* (2017.01); *G06V 20/68* (2022.01); *G06T 2207/10048* (2013.01)

(58) Field of Classification Search
CPC ... G06T 7/10; G06T 7/11; G06T 7/136; G06T 2207/10048; G06V 10/26; G06V 20/68
See application file for complete search history.

(56) References Cited

U.S. PATENT DOCUMENTS

| | | | | |
|---|---|---|---|---|
| 9,414,444 | B2 | 8/2016 | Libman | |
| 10,074,028 | B2 | 9/2018 | Gupta | |
| 10,674,568 | B2 | 6/2020 | Noda | |
| 12,185,862 | B2 * | 1/2025 | Bhogal | ..................... G06T 7/70 |
| 2015/0289324 | A1 * | 10/2015 | Rober | .................... H05B 6/668 |
| | | | | 219/707 |
| 2017/0299194 | A1 | 10/2017 | Kamei | |

(Continued)

FOREIGN PATENT DOCUMENTS

| | | | |
|---|---|---|---|
| CN | | 105351981 A | 2/2016 |
| CN | | 113838004 A | 12/2021 |
| WO | WO 2022-133190 A9 | | 8/2022 |

OTHER PUBLICATIONS

Kütük, Z., & Algan, G. (May 26, 2022). Semantic Segmentation for Thermal Images: A Comparative Survey. ArXiv.org. https://arxiv.org/abs/2205.13278 (Year: 2022).*

(Continued)

*Primary Examiner* — Gregory A Morse
*Assistant Examiner* — David Alexander Wambst

(57) ABSTRACT

In one embodiment, a method includes accessing, by a computing device, a thermal image of a space within a cooking apparatus, wherein the space contains a food item. The method further includes segmenting, by a computing device and based on the thermal image, the food item in the space from the food item's environment.

20 Claims, 8 Drawing Sheets

(56) References Cited

U.S. PATENT DOCUMENTS

| | | |
|---|---|---|
| 2018/0152995 A1 | 5/2018 | Noda |
| 2020/0077473 A1 | 3/2020 | Corona |
| 2020/0292392 A1 | 9/2020 | Hooker |
| 2021/0102708 A1 | 4/2021 | Bhogal |
| 2021/0307135 A1* | 9/2021 | Hooker ................ H05B 6/6411 |

OTHER PUBLICATIONS

Li, C., Xia, W., Yan, Y., Luo, B., & Tang, J. (2019). Segmenting Objects in Day and Night: Edge-Conditioned CNN for Thermal Image Semantic Segmentation. ArXiv.org. https://arxiv.org/abs/1907. 10303 (Year: 2019).*

Park, G., Lee, M., Jang, H., & Kim, C. (2021). Thermal anomaly detection in walls via CNN-based segmentation. Automation in Construction, 125, 103627. https://doi.org/10.1016/j.autcon.2021. 103627 (Year: 2021).*

Khan, T. (2020). An Intelligent Microwave Oven with Thermal Imaging and Temperature Recommendation Using Deep Learning. Applied System Innovation, 3(1), 13. https://doi.org/10.3390/asi3010013 (Year: 2020).*

Cooksy (https://cooksy.com/), Accessed on Nov. 7, 2022.

June Oven (https://juneoven.com/), Accessed on Oct. 25, 2022.

Samsung Bespoke Oven 35L (Google translation from Korean to English of https://www.samsung.com/sec/cooking-appliances/microwave-oven-convection-mc35a8899lr-d2c/MC35A8899LM/), Accessed on Oct. 25, 2022.

Samsung Bespoke AI Oven (https://www.youtube.com/watch?v=hXwzlXJd7c4&t=354s starting at 5 minutes and 54 seconds), Accessed on Oct. 25, 2022.

International Search Report and Written Opinion in Application No. PCT/KR2023/010512, Oct. 24, 2023.

* cited by examiner

SEGMENTING FOOD ITEMS FROM BACKGROUND IN A COOKING APPARATUS

PRIORITY CLAIM

This application claims the benefit under 35 U.S.C. 119 of U.S. Provisional Patent Application No. 63/418,415 filed Oct. 21, 2022.

TECHNICAL FIELD

This application generally relates to segmenting food items from background in a cooking apparatus.

BACKGROUND

Cooking appliances, such as microwave ovens, kitchen ranges such as gas or electric ranges, toaster ovens, and air fryers, all require a user to input settings for using the appliance. For example, a microwave oven may require the user to input a time setting (e.g., how long to cook the food) and a power setting, while a range may require the user to input a temperature setting and then independently monitor the length of cooking time. A cooking appliance may also permit users to select a preset entry, which corresponds to preset time and power settings by inputting, for example, a type of food and a weight or quantity of the food. Then, based on the user's inputs, the cooking appliance cooks according to the predetermined values for time, power, and/or temperature.

DESCRIPTION OF EXAMPLE EMBODIMENTS

Fixed or preset control of cooking variables, such as time and temperature, often results in suboptimal cooking (such as over-cooking or under-cooking food), in part due to the wide variability of the food (ingredients, density, etc.). These kinds of controls also require user intervention (e.g. the user has to check the pizza multiple times to avoid it getting burnt) to monitor the cooking process. For example, in a microwave oven, a user may stop the microwave because the user notices food splatter while reheating leftovers. In another scenario, a user may have to add more time because the leftovers were too cold after the initial heating time finished.

An improved cooking apparatus would automatically determine relevant properties of food items being cooked, such as the food item's average temperature, max and min temperature, browning level, etc. and adjust the cooking controls accordingly during the cooking process to avoid the problems associated with fixed or preset cooking inputs. But in order to automatically detect relevant properties of a food item, the system would first need to accurately distinguish the food item from its environment. For example, a food item placed in a microwave may have a very different thermal properties (e.g., temperature) before, during, and after heating than the interior of the microwave, and tuning cooking controls based on erroneously attributing the interior of the microwave's thermal properties to the food's thermal properties would lead to poor cooking performance.

This disclosure describes systems and methods for automatically and accurately distinguishing food items in a cooking apparatus from background, which includes the non-food environment of the food item. For example, the background may include the interior of the cooking appliance or a container (such as a plate, bowl, pan, rotating dish, or rack) that holds the food item. Moreover, as explained more fully herein, the systems and methods for distinguishing food items from background are agnostic to the specific type of food item being cooked. Moreover, as explained more fully herein, this disclosure describes monitoring and updating or refining the segmentation of food items from background as cooking proceeds, for example to account for changes in shape, size, and/or location of food in the cooking apparatus (e.g., due to expansion, melting, sliding, etc.).

Figure 1:
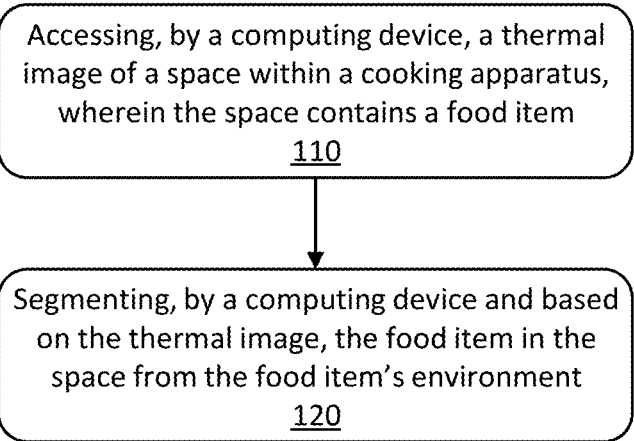
FIG. 1 illustrates an example method for distinguishing a food item from its background.

FIG. 1 illustrates an example method for distinguishing a food item from its background. Step 110 of the example method of FIG. 1 includes accessing, by a computing device, a thermal image of a space within a cooking apparatus, where the space contains a food item. In particular embodiment, an image may be accessed from a memory of a computing device, which may be integrated all or in part with the cooking apparatus. For example, a microwave or oven may include a processor and a memory for storing and processing images, as explained more fully herein, and step 110 may include accessing a thermal image stored by the cooking apparatus. In particular embodiments, step 110 may include accessing an image from another computing device, such as a client device (e.g., smartphone, laptop, etc.) or a server device that stores the thermal image. In particular embodiments, step 110 may be performed by the cooking apparatus, or may be performed by a client or sever computing device.

In particular embodiments, accessing a thermal image of a space within a cooking apparatus may include capturing a thermal image of that space. The thermal image is captured by one or more thermal cameras, or thermal-imaging sensors, including but not limited to a microbolometer array or a thermopile array sensor. The thermal imaging sensor can be placed anywhere in or near the cooking appliance so that the cooking space is within the sensor's field of view. For example, a thermal sensor may be located on or in a fixed or a movable mount within a microwave or within an oven. For example, in a microwave oven, the thermal-imaging sensor can be placed in the ceiling of the microwave cavity using a fixed mount. In a kitchen range, the thermal-imaging sensor may be placed in the hood, using a magnetic mount, or in the stove, using a tripod. Likewise, an optical sensor, such as a CMOS or a CCD sensor, may be used to capture an optical image, and in these embodiments the optical sensor can be placed anywhere in or near the cooking appliance so that the cooking space is within the sensor's field of view. For example, an optical sensor may be located on or in a fixed or a movable mount within a microwave or within an oven. For example, in a microwave oven, the optical-imaging sensor can be placed in the ceiling of the microwave cavity using a fixed mount. In a kitchen range, the optical-imaging sensor may be placed in the hood, using a magnetic mount, or in the stove, using a tripod.

Step 120 of the example of FIG. 1 includes segmenting, by a computing device and based on the thermal image, the food item in the space from the food item's environment. In particular embodiments, segmenting the food item from the food item's environment, or background, includes generating a binary mask that identifies whether each pixel in the image (or whether a group of pixels in the image) is a food item or not a food item (i.e., is part of the background). In particular embodiments, segmenting the food item from the food item's environment may include generating a probability associated with each pixel, or group of pixels, that identifies the probability that the pixel or group of pixels corresponds to a food item.

In particular embodiments, step 120 may include segmenting the image based on an initial temperature difference among objects captured by the image, for example between a food item and the interior of the cooking appliance and/or a container (e.g., plate or dish) that holds the food item. In particular embodiments, the initial temperature of a food item is different than the temperature of the cooking space. For example, a food item may initially be frozen or refrigerated before being heated, which leads to an initial temperature difference between the food item and the food item's environment when placed in the cooking apparatus. As another example, the food item may be cooked some, and then the cooking may be interrupted and then continued after a period of time. If the food item's temperature has not equilibrated with the temperature of the cooking apparatus, then there would be a temperature difference between the food item and its environment in the cooking apparatus. As another example, the food item may be stored in a different environment than the cooking apparatus (e.g., in a pantry that is cooler than the kitchen in which the cooking apparatus is located), leading to an initial temperature difference between the food item and the food item's environment when placed in the cooking apparatus.

In particular embodiments, temperature thresholding may be used to identify areas (e.g., pixels) of a thermal image that correspond to a food item. This disclosure contemplates that any suitable thresholding algorithm or algorithms may be used, such as simple thresholding, where the threshold is determined based on some assumption or knowledge about the temperature of the food or the background, or automatic thresholding (e.g. Otsu's method), where the threshold is automatically set by an algorithm based on the thermal image itself.

Figure 2:
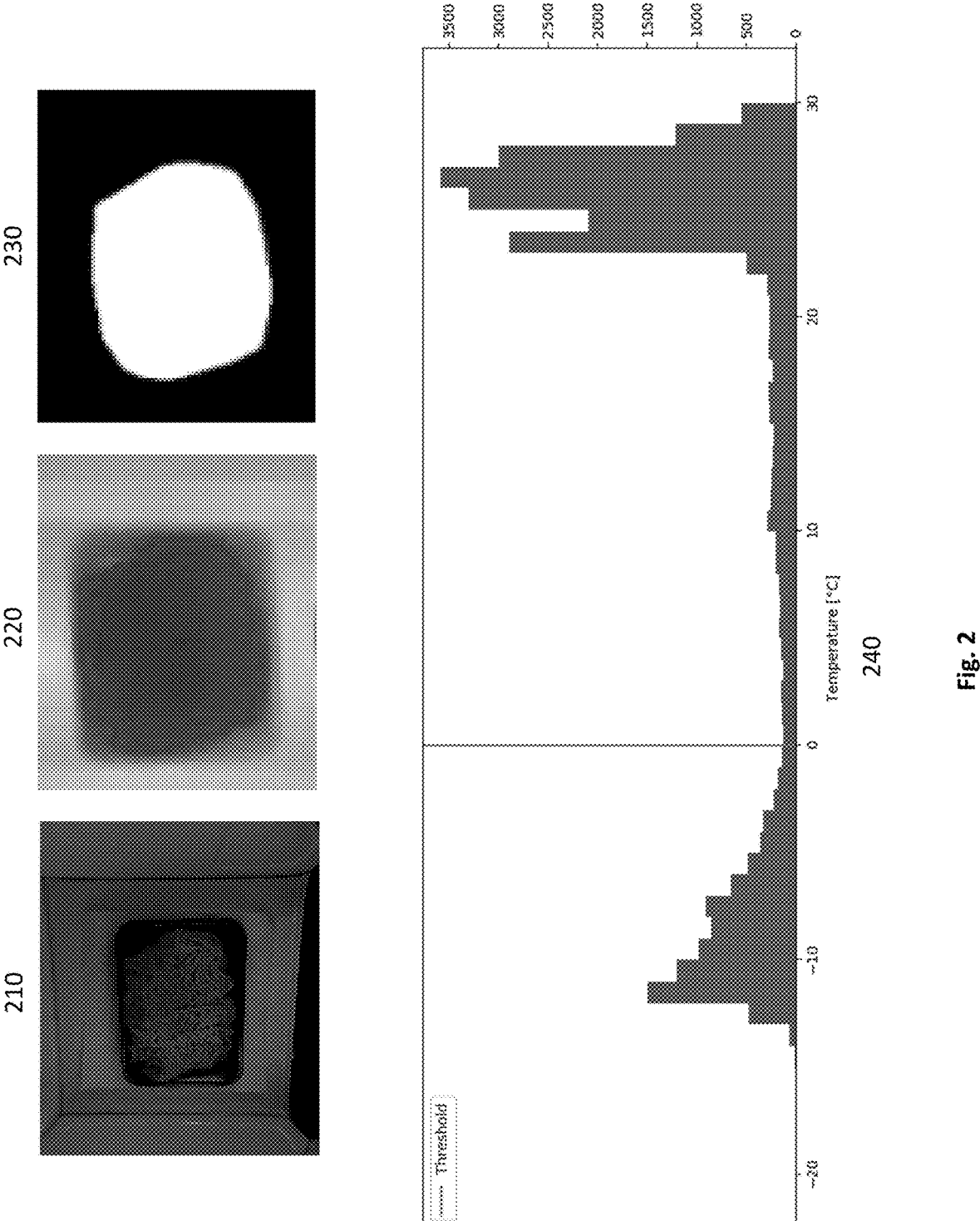
FIG. 2 illustrates an example of segmenting a food item from its background based on a thermal image.

FIG. 2 illustrates an example of segmenting a food item from its background based on a thermal image. Image 210 illustrate a grayscaled RGB image of a space in a cooking apparatus, e.g., a microwave, that contains some frozen hamburger meat. As illustrated in image 210, the meat is placed on a container that is placed on a paper towel within the interior of the microwave. Image 220 illustrates a thermal image of the space after the meat is placed in the microwave oven and before heating. Image 230 illustrates a binary mask, generated by segmenting image 220 based on an initial temperature difference, where the white portions of the mask indicate a food item and the black portions indicate a non-food item. Graph 240 illustrates a temperature distribution of image 220, where in graph 240 the x axis corresponds to temperature and the y axis corresponds to the number of pixels. As illustrated in graph 240, the initial temperature difference between the food item and the environment result in an approximately bimodal distribution. A threshold may be determined based on the distribution, and as illustrated in graph 240 and image 230, in this example the threshold was determined to be 0 degree Celsius based on a simple thresholding algorithm. Then, segmentation is performed based on this threshold, i.e., if a pixel's temperature is less than the threshold, then the pixel is identified as a food item, and if the pixel's temperature is greater than the threshold, then the pixel is identified as a non-food item.

In particular embodiments, an initially segmented image, such as the segmented image illustrated in image 230 of FIG. 2, may be refined. For example, after obtaining an initial segmented image based on thresholding due to an initial temperature difference, then the segmentation can be refined by removing small, connected components (e.g., group of pixels) that have small size (e.g., a few number of pixels), which may appear due to noise in the image. For example, if in image 230 a small group of pixels was identified as a food item and those pixels that were isolated from the large, white region identified as food item, then the small group of pixels may be re-coded to have the value of their surroundings, i.e., a non-food item. As another example of segmentation refinement, a segmented image can be refined by using morphological transforms (e.g. dilation, erosion), or calculating the individual convex hull of the remaining components, to get a smoother edge or boundary between food-item regions and non-food item regions. These morphological transforms may be applied after refinement by removing small components, in particular embodiments.

Figure 3:
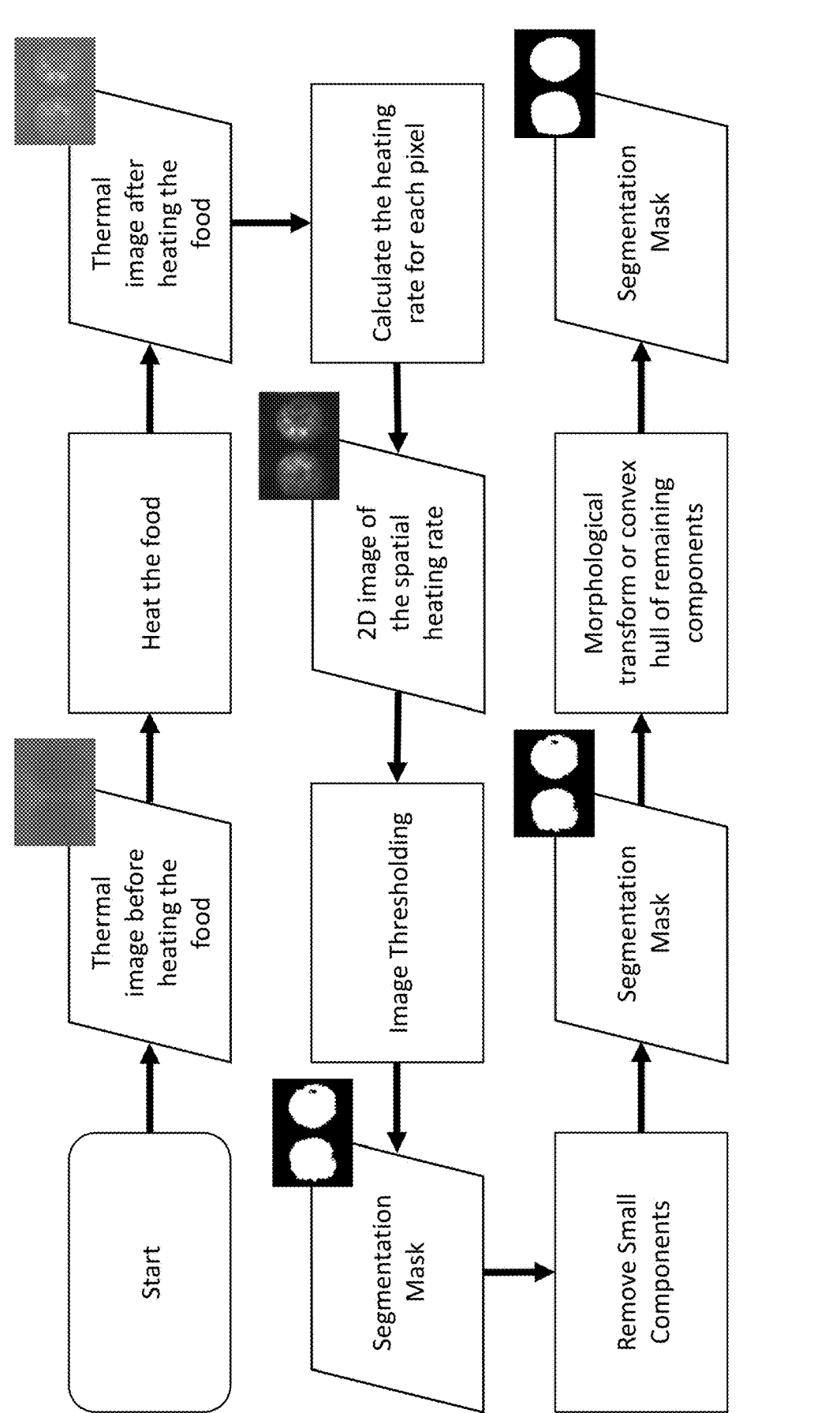
FIG. 3 illustrates an example procedure for segmenting an image according to a difference in heating rates.

In particular embodiments, step 120 may include segmenting the image based on a difference in heating rate between objects captured by the image. FIG. 3 illustrates an example procedure for segmenting an image according to a difference in heating rates. As illustrated in FIG. 3, a thermal image of a food item is acquired before heating the food item. For example, an initial image may be taken in response to a determination that the user has opened and shut the door of the cooking appliance or in response to a determination that the weight inside the cooking apparatus has increased or that the contents in the cooking apparatus has changed (e.g., by comparing optical or thermal images). As illustrated in FIG. 3, after an initial thermal image is acquired, then some heating is provided by the cooking apparatus, and a subsequent thermal image is acquired after heating. The subsequent image may be taken after a fixed amount of time, a fixed amount of heating, etc.

Figure 4:
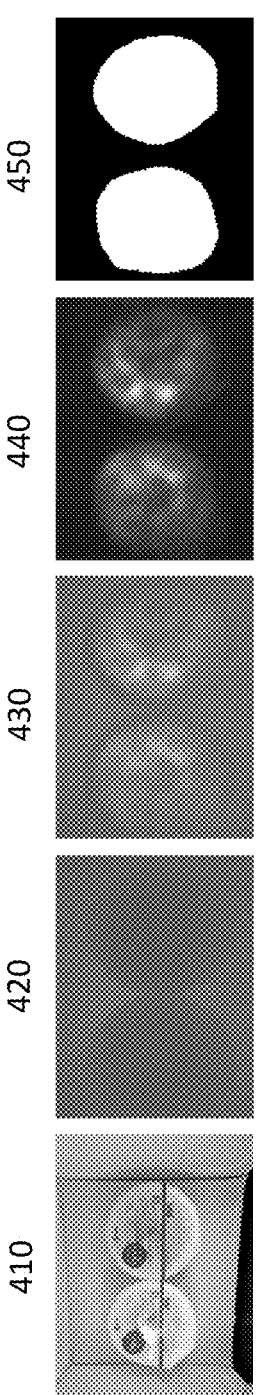
FIG. 4 illustrates an example approach for determining a difference in heating rates.
Figure 4:
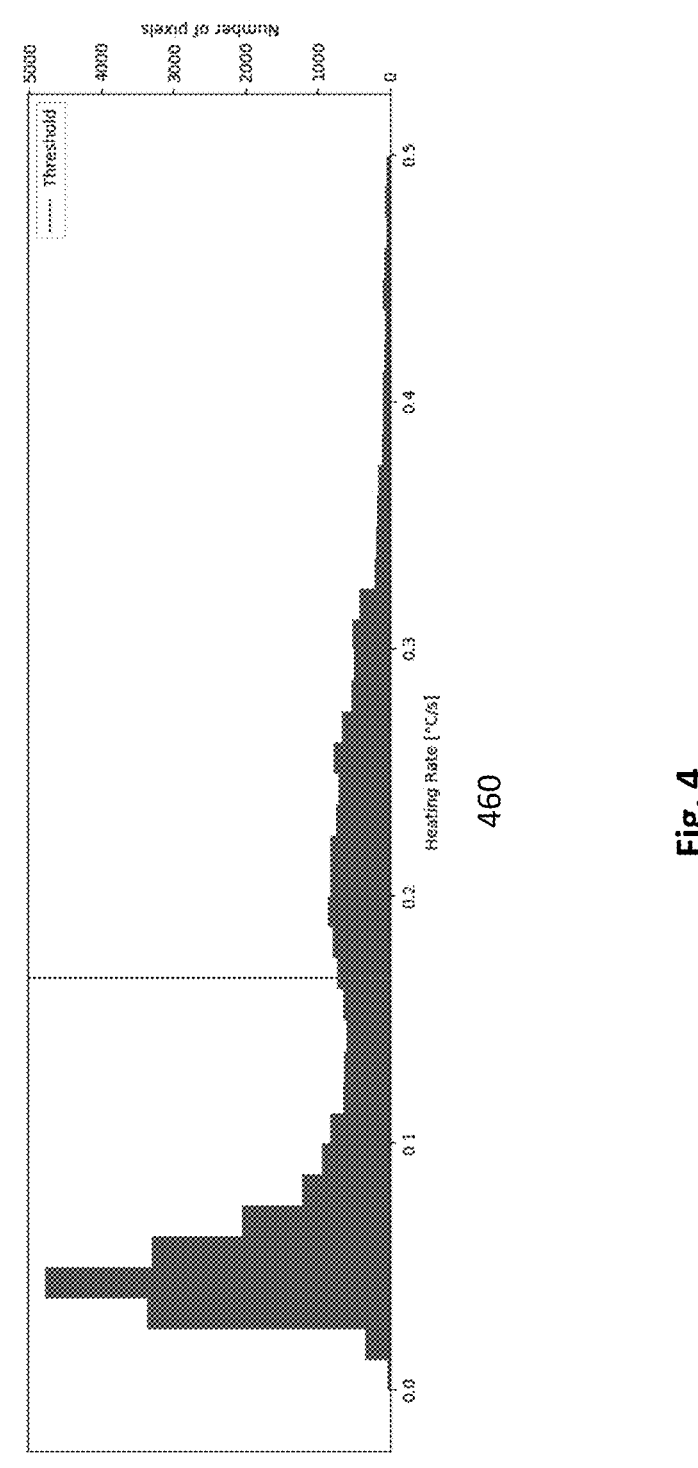

After the initial and subsequent thermal images are acquired, the procedure in FIG. 3 determines the heating rate for each pixel in the thermal images. FIG. 4 illustrates an example approach to determining a difference in heating rates using an example of two packages of room-temperature instant rice in a microwave. Image 410 illustrates a greyscaled initial RGB image of the instant rice, and image 420 illustrates an initial thermal image of the instant rice. Image 430 illustrates a subsequent thermal image after some heating has been applied, image 440 illustrates the spatial heating rate as determined from image 430 and image 420, and image 450 illustrates a binary mask based on the distribution of heating rates. As shown in FIG. 4, graph 460 illustrates a distribution of heating rates, as determined based on image 440 generated from initial thermal image 420 and subsequent thermal image 430. The x axis in graph 460 is a heating rate (in degrees Celsius per second), and the y axis corresponds to the number of pixels. As discussed above, a thresholding procedure determines a threshold for the distribution in graph 460, and in this example, pixels associated with a heating rate above the threshold are identified as a food items, while pixels associated with a heating rate below the threshold are identified as non-food items.

As the example of FIG. 4 illustrates, more than one food item may be placed in a cooking apparatus, and the systems and methods described herein can segment each food item from background. In addition, while the example of FIG. 4 and FIG. 2 illustrate bimodal distributions, and therefore use a single threshold to differentiate between food items and non-food items, this disclosure contemplates that other distributions, such as other multimodal distributions, may result in more than one threshold. For example, two or more different kinds of food items (e.g., a plate of leftovers of various kinds) may be introduced to a cooking apparatus, and the food items may have different thermal properties, therefore resulting in, e.g., different heating rates. The resulting distribution may therefore be a multimodal distribution with a number of peaks, and thresholds may be used to separate these modes from each other and to ultimately segment food items from non-food items (e.g., based on the known thermal properties, such as heating rate, of the background such as the interior of the cooking apparatus and any container that holds the food).

Returning to the example of FIG. 3, after the heating rate for each pixel is calculated, a 2D image of the spatial heating rate is generated and a segmentation mask is generated based on image thresholding, for example according to the techniques described above in connection with the example of FIG. 4. Additional segmentation refinement may then be performed, such as removing small components and performing morphological transforms of the remaining components, as described more fully above. The end result is a final segmentation mask identifying food items and non-food items, in this example based on a difference in heating rates of objects within the cooking apparatus.

In particular embodiments, segmentation may be refined by using image-frame subtraction on at least a pair of images, where one of the images is of an empty cooking space of the cooking apparatus and one image includes a food item in the space. As explained more fully herein, the images may be optical images, such as RGB or greyscale images, or may be thermal images. The image of the empty cooking space can be saved in the memory of the cooking apparatus or can be saved remotely from the cooking apparatus and accessed by the cooking apparatus, or by a computing device that performed the image subtraction. An image of the empty cooking space can be updated manually by a user, and/or can be updated automatically (e.g., periodically) when the cooking apparatus is not in use. For example, the images can be updated overnight, or when the user turns on or opens a door to the apparatus, such as right before placing food in a cooking appliance.

When the user starts the cooking process, a current image of the space within the cooking apparatus containing the food item is obtained. Then, the initial optical or thermal image of the empty cooking space can be compared to the current optical or thermal image by calculating the absolute difference between the two images. Then, the process segments the food and the background based on the absolute difference between the two images, using image thresholding. The result can be used to refine a segmentation mask obtained by using temperature difference and/or heating-rate differences, as described above.

In particular embodiments, when using thermal imaging, a segmentation process can use a simple thresholding by setting the threshold difference between images to approximately be the noise level of the thermal camera (e.g. 0.5° C.). In particular embodiments, when using optical imaging, an initial RGB image and a current RGB image can each be converted to grayscale before calculating the absolute difference between the two images and then using image thresholding to create a segmentation mask. In particular embodiments, when using RGB images, image thresholding can be applied to each of the RGB channels individually, and the resulting segmented (e.g., binary) images for each channel can be combined into a single segmented image using a voting system where a given pixel can be considered to be part of a food item or part of the background depending on the value of each of the channels. For example, a pixel may be considered to be a food item only if two or more channels identify the pixel as a food item (e.g., by identifying the pixel as having a particular binary value, e.g., 1, in a binary mask).

Under any approach, the segmentation based on image subtraction may then be further refined, for example by removing small unconnected components and/or by performing morphological transforms, as described more fully above.

In particular embodiments, the view of an optical camera may be different than the view of a thermal camera. For example, the two cameras may have different orientations or different resolutions, or may suffer from different distortions, such that there is not a 1-to-1 pixel match between an image obtained by an optical camera and an image obtained by a thermal camera. In such situations, applying a mask generated by one camera to an image from the other camera requires a mapping between the two images to ensure that the features in the mask line up with the features in the image. In such situations, a perspective transformation may be performed, for example using homography techniques to shift from one view of the segmentation mask (e.g. the view of the RGB or the thermal camera) to another view by multiplying a homography matrix with the points in one view to find their corresponding locations in the other view. This mapping may be performed with, for example, calibration images recorded concurrently by both cameras. In particular embodiments, a perspective transformation may be performed after obtaining a segmentation mask from the perspective of an optical camera, in order to convert the segmentation mask to the view of a thermal camera.

Figure 5:
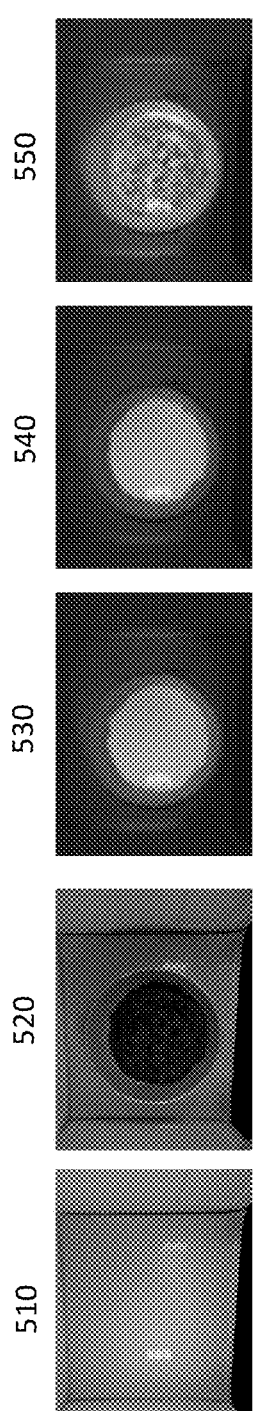
FIG. 5 illustrates an example of creating a segmentation mask using image subtraction.
Figure 5:
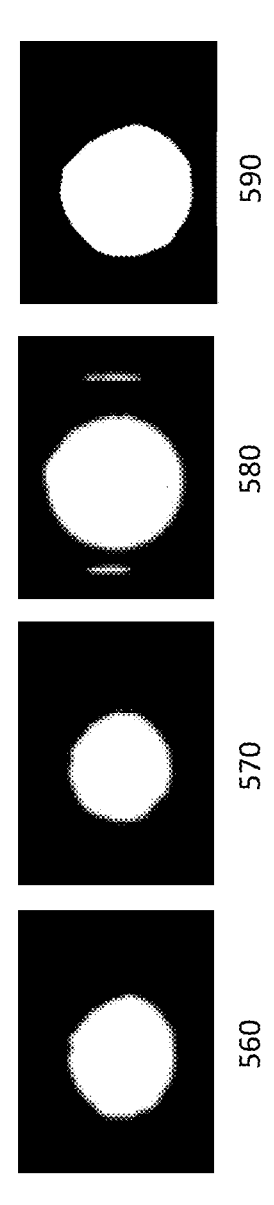

FIG. 5 illustrates an example of creating a segmentation mask using image subtraction for a pair of RGB images. In FIG. 5, image 510 is an RGB image of an empty cooking apparatus, such as a microwave. Image 520 is taken after a food item (in this example, a bowl of chili) is placed in the microwave. Images 530, 540, and 550 show the absolute difference between image 520 and image 510 for each of the three individual RGB channels, respectively. Masks 560, 570, and 580 correspond to binary segmentation masks determined based on absolute-difference images 530, 540, and 550. Image 590 illustrates a final segmentation mask, which in this example is obtained by applying a voting system to masks 560, 570, and 580 and transforming the resulting mask to the view of a thermal camera.

Figure 6:
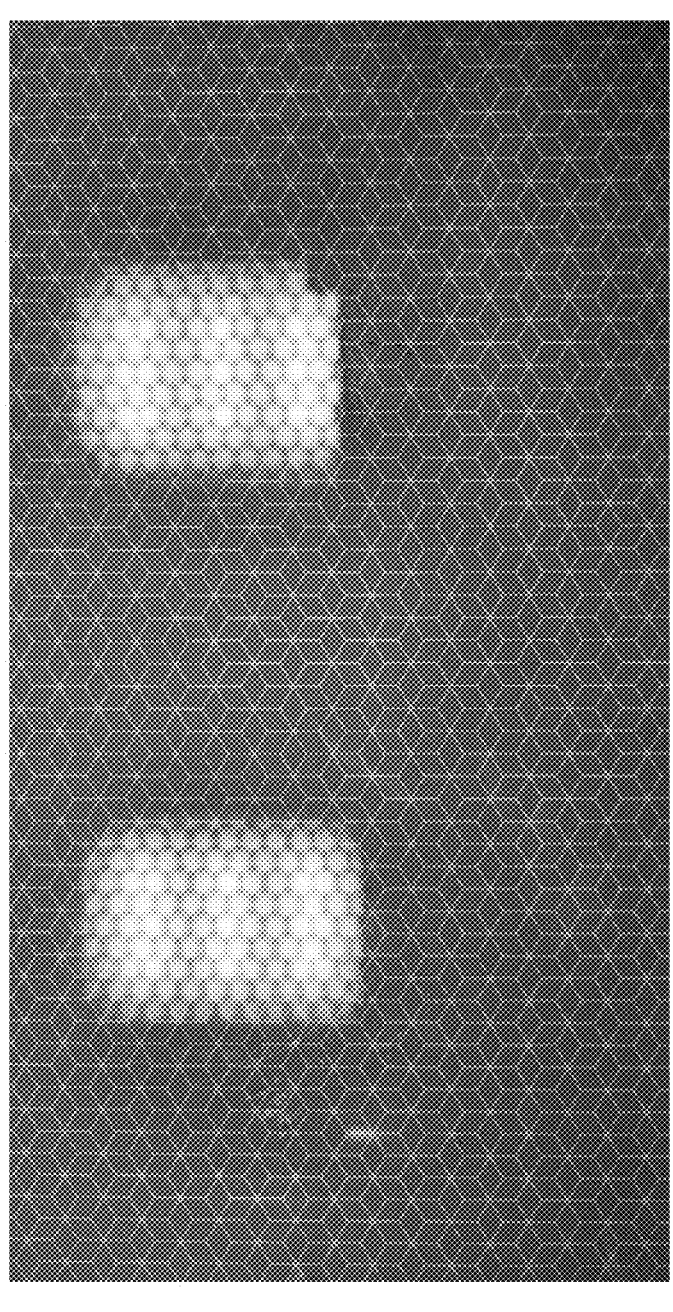
FIG. 6 illustrates an example of a geometric pattern in a cooking apparatus that may be used to improve image segmentation of a food item from its background.

In particular embodiments, at least part of an interior of a cooking apparatus (i.e., a portion that is in the field of a view of a camera) may be patterned to increase segmentation accuracy. For example, in situations where the color of the food is similar to the color of the container or of the background, a background with a geometric pattern in black and white or in two or more colors may result in a higher absolute difference when performing image subtraction from optical images, which will result in a more defined segmentation mask. For example, FIG. 6 illustrates an example of a geometric pattern in a cooking apparatus that may be used to improve image segmentation of a food item from its background. In addition or the alternative, a thermal pattern may also be used in at least part of the interior of the cooking apparatus. For example, different materials radiate differently in the IR spectrum captured by thermal cameras, even when at the same temperature, for example based on how similar the material is to an ideal blackbody. Therefore, thermal patterning that is detectable by a thermal camera may be used to improve segmentation of images using thermal techniques. This disclosure contemplates that patterning detectable by an optical sensor or by a thermal sensor may be two dimensional or three dimensional.

In particular embodiments, segmentation of a food item from its background may occur multiple times during a cooking process. This can both refine the segmentation and update the segmentation as the contours of a food item change during cooking. For example, a frozen food item may shrink, flatten, or slide as it thaws, which may require updating the segmentation mask during the cooking process to accurately monitor the status of the food. In other cases, such as when the initial mask is not entirely accurate, then refining the initial segmentation mask one or more times may improve accuracy.

Figure 7:
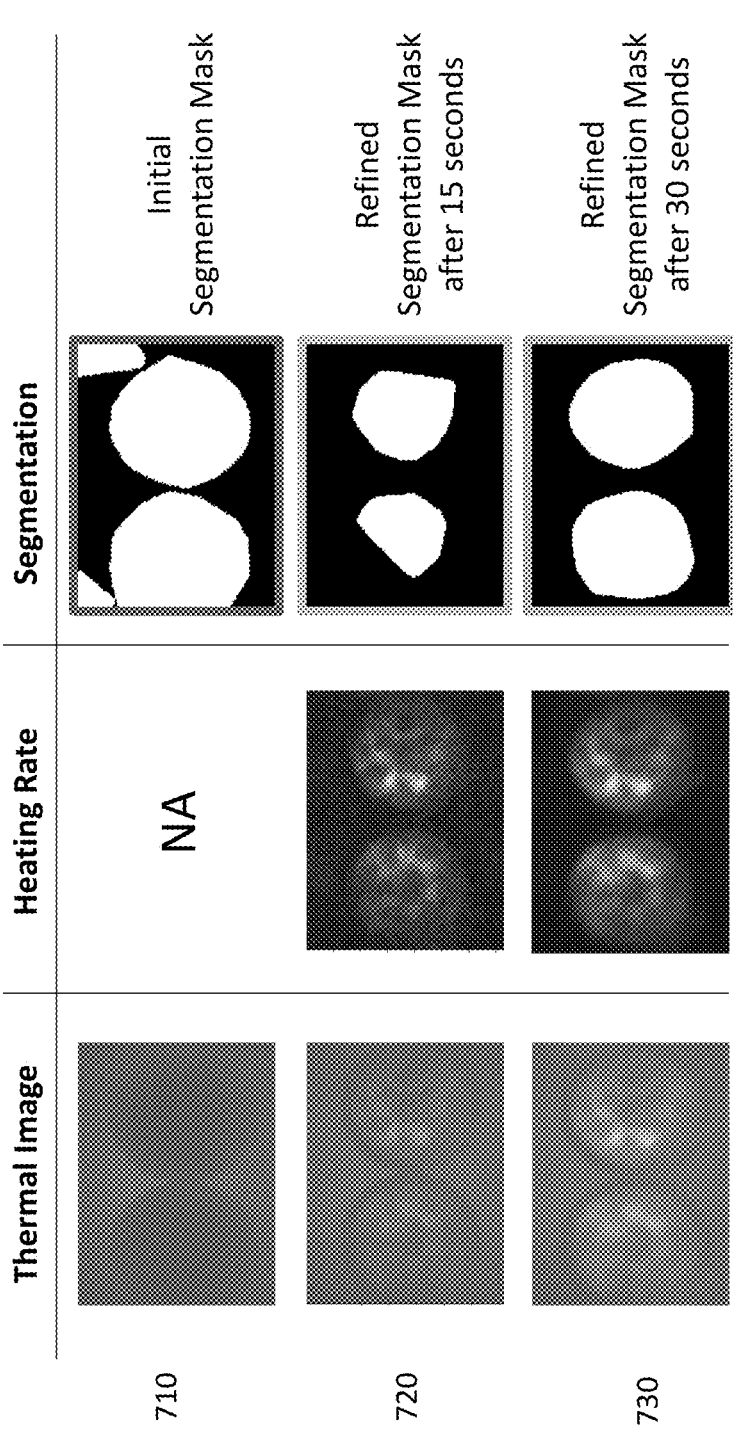
FIG. 7 illustrates an example of refining and updating a segmentation mask during a cooking process.

In particular embodiments, the steps of a segmentation procedure may be repeated one or more times during the cooking process in order to refine or update a segmentation mask. The segmentation procedure (e.g., based on initial temperature difference, differential heating rate, image of empty cooking space, etc.) used to determine an initial segmentation mask may be the same as, or may be different than, a segmentation procedure used to refine or update a segmentation mask. For example, FIG. 7 illustrates an example of refining and updating a segmentation mask during a cooking process. In the example of FIG. 7, row 710 illustrates a thermal image and a corresponding initial segmentation mask based on an initial temperature difference for a pair of instant-rice cups. As illustrated in row 710, because the temperature of the instant rice was close to the background temperature, a simple segmentation approach can result in artifacts in the segmented image. Row 720 illustrates an example of a thermal image and a heating-rate differential obtained after 15 seconds of heating is applied. Row 720 also illustrates how the segmentation has improved as a result of updating the segmentation mask based on the thermal image and the heating-rate differential after 15 seconds of heating. Row 730 illustrates an example of a thermal image and a heating-rate differential obtained after 30 seconds of heating is applied. Row 730 illustrates how the segmentation has improved as a result of updating the segmentation mask based on the thermal image and the heating-rate differential after 30 seconds of heating, such that the image segmentation is very accurate.

In particular embodiments, a segmentation can combine segmentation results obtained from different methods to arrive at a final segmented image. For example, and as illustrated in the FIG. 7, one segmentation may be obtained using a thermal-difference approach, and another segmentation may be obtained using a heating-rate approach. A final segmentation may then be obtained by combining the results of these two approaches. For example, a voting system may be applied, where a pixel is considered to be part of a food item only if that pixel corresponds to a food item in both segmentation methods, or in all or a majority of methods, if more than two methods are used (for example, if each of image subtraction, temperature difference, and heating-rate differentials are all used to segment an image). In particular embodiments, segmentation approaches may be weighted based on, for example, the expected or determined accuracy of that approach, and a weighted combination (e.g., a weighted sum) of the resulting approaches may be compared to a threshold value for each pixel to determine whether that pixel should be considered to be a food item in a segmentation mask.

In particular embodiments, a recent segmentation may completely replace a previous segmentation. For example, with reference to the example of FIG. 7, the segmentation obtained in row 730 may be based entirely on a current thermal image and a current heating-rate determination. In the alternative, a segmentation image may be refined or updated based on segmentations determined over time. For example, a pixel may be considered to be a food item only if all or a majority of two or more final segmentations determined over time identify that pixel as a food item. In particular embodiment, a more recent segmentation may be weighted more highly than an older segmentation. In particular embodiments, a weight may be based on the degree of contrast associated with a segmentation result. For example, if a current segmentation has lower contrast than a previous one (e.g., a temperature-difference approach is used and the previously cold food has heated to the point that it appears to be the same temperature as the background), then the current segmentation may be discarded or weighted less than a previous segmentation.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 8, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 8, by a processor coupled to non-transitory computer readable storage media, or any suitable combination thereof.

After segmentation of one or more food items from background is performed, the segmented image can then be used to, for example, enable accurate automatic cooking control that is based on detecting the food item's thermal properties, such as maximum or minimum temperature. The segmented image may also be used to, for example, provide a visual display of the food item to the user or augment a visual display, for example by zooming on a burned area or by blurring the background of the image. Moreover, a properly segmented image may be used to detect one or more events during a cooking process, such as e.g., food splatter or overcooking, and/or may be used to detect if a cooking apparatus is empty or occupied. For example, the segmented image may be used to turn off an empty microwave or remind a user that they have a food item in the oven.

Figure 8:
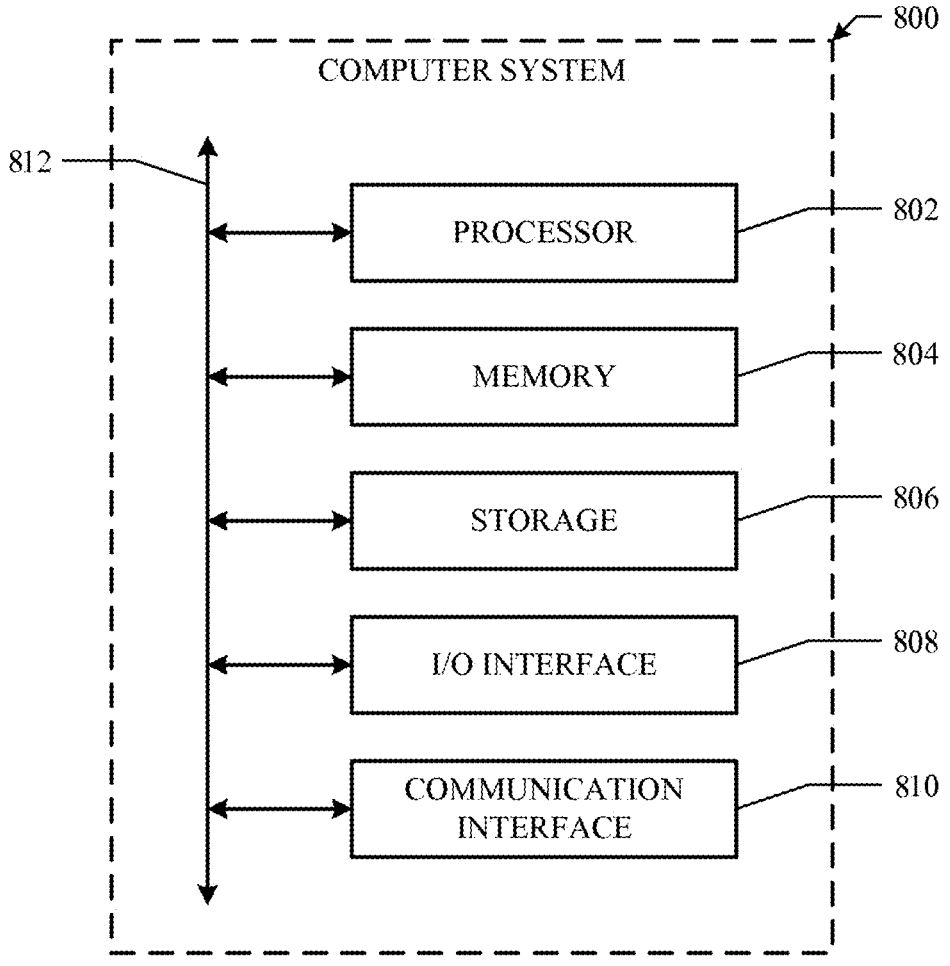
FIG. 8 illustrates an example computing device.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing, by a computing device, a thermal image of a space within a cooking apparatus, wherein the space contains a food item;

identifying, from the thermal image, a temperature associated with each of a plurality of pixels in the thermal image;

determining a temperature threshold and a heating-rate threshold for segmenting the food item in the space from the food item's environment by:

determining, from the temperature associated with each of the plurality of pixels in the thermal image and prior to segmenting the food item from the food item's environment, a temperature distribution identifying a number of pixels in the thermal image that correspond to each of a plurality of separate temperature values, by determining, for each of the plurality of separate temperature values, a total number of pixels in the thermal image having a temperature that is within that respective temperature value;

determining, from the temperature distribution, at least a pair of peaks in the temperature distribution, each peak having a distinct temperature value;

determining, based on the determined temperature distribution and prior to segmenting the food item from the food item's environment, a temperature threshold that separates one of the at least one pair of peaks in the temperature distribution;

heating, using the cooking apparatus, the food or the space within the cooking apparatus;

accessing a second thermal image of the space after applying heat to the food or to the space;

determining, based on the thermal image of the space before heating and the second thermal image of the space after heating, a heating rate associated with each of the plurality of pixels in the thermal image of the space; and determining, from a distribution of heating rates associated with the plurality of pixels of the thermal image, a heating-rate threshold; and segmenting the food item in the space from the food item's environment by, for each of the plurality of pixels in the thermal image, identifying the pixel as associated with the food item or as associated with the food item's environment based on a combination of (1) that pixel's associated temperature relative to the temperature threshold in the temperature distribution and (2) that pixel's associated heating rate relative to the heating-rate threshold in the distribution of heating rates.

2. The method of claim 1, wherein the plurality of pixels in the thermal image includes every pixel in the thermal image.

3. The method of claim 1, wherein the food item's environment comprises one or more of: (1) an interior of the cooking apparatus or (2) a container within the cooking apparatus.

4. The method of claim 1, further comprising:

accessing an initial image of the space within the cooking apparatus during a time when the space does not contain any food item;

detecting a start of a cooking process of the cooking apparatus; and capturing a subsequent image of the space within the cooking apparatus after the cooking process is started, wherein segmenting the food item in the space from the food item's environment is further based on the initial image of the space and on the subsequent image of the space after the cooking process is started.

5. The method of claim 4, wherein the initial image of the space and the subsequent image of the space comprise thermal images.

6. The method of claim 4, wherein the initial image of the space and the subsequent image of the space comprise optical images.

7. The method of claim 1, further comprising:

applying heat, using the cooking apparatus, to the food or to the space within the cooking apparatus;

accessing an image of the space after applying heat; and re-segmenting, based on the image of the space after applying heat, the food item in the space from the food item's environment.

8. The method of claim 1, wherein:

segmenting the food item comprises: when both the pixel's associated temperature relative to the temperature threshold and the heating rate associated with that pixel identify the pixel as a food-item pixel, then identifying the pixel as a food-item pixel, and otherwise identifying the pixel as a background pixel.

9. One or more non-transitory computer readable storage media embodying instructions and coupled to one or more processors that are operable to execute the instructions to:

access a thermal image of a space within a cooking apparatus, wherein the space contains a food item; and identify, from the thermal image, a temperature associated with each of a plurality of pixels in the thermal image;

determine a temperature threshold and a heating-rate threshold for segmenting the food item in the space from the food item's environment by:

determining, from the temperature associated with each of the plurality of pixels in the thermal image and prior to segmenting the food item from the food item's environment, a temperature distribution identifying a number of pixels in the thermal image that correspond to each of a plurality of separate temperature values, by determining, for each of the plurality of separate temperature values, a total number of pixels in the thermal image having a temperature that is within that respective temperature value;

determining, from the temperature distribution, at least a pair of peaks in the temperature distribution, each peak having a distinct temperature value;

determining, based on the determined temperature distribution and prior to segmenting the food item from the food item's environment, a temperature threshold that separates one of the at least one pair of peaks in the temperature distribution;

heating, using the cooking apparatus, the food or the space within the cooking apparatus;

accessing a second thermal image of the space after applying heat to the food or to the space;

determining, based on the thermal image of the space before heating and the second thermal image of the space after heating, a heating rate associated with each of the plurality of pixels in the thermal image of the space; and determining, from a distribution of heating rates associated with the plurality of pixels of the thermal image, a heating-rate threshold segment the food item in the space from the food item's environment by, for each of the plurality of pixels in the thermal image, identifying the pixel as associated with the food item or as associated with the food item's environment based on a combination of (1) that pixel's associated temperature relative to the temperature threshold in the temperature distribution and (2) that pixel's associated heating rate relative to the heating-rate threshold in the distribution of heating rates.

10. A system comprising one or more processors and a non-transitory computer readable storage media embodying instructions coupled to the one or more processors, the one or more processors operable to execute the instructions to:

access a thermal image of a space within a cooking apparatus, wherein the space contains a food item; and identify, from the thermal image, a temperature associated with each of a plurality of pixels in the thermal image;

determine a temperature threshold and a heating-rate threshold for segmenting the food item in the space from the food item's environment by:

determining, from the temperature associated with each of the plurality of pixels in the thermal image and prior to segmenting the food item from the food item's environment, a temperature distribution identifying a number of pixels in the thermal image that correspond to each of a plurality of separate temperature values, by determining, for each of the plurality of separate temperature values, a total number of pixels in the thermal image having a temperature that is within that respective temperature value;

determining, from the temperature distribution, at least a pair of peaks in the temperature distribution, each peak having a distinct temperature value;

determining, based on the determined temperature distribution and prior to segmenting the food item from the food item's environment, a temperature threshold that separates one of the at least one pair of peaks in the temperature distribution;

heating, using the cooking apparatus, the food or the space within the cooking apparatus;

accessing a second thermal image of the space after applying heat to the food or to the space;

determining, based on the thermal image of the space before heating and the second thermal image of the space after heating, a heating rate associated with each of the plurality of pixels in the thermal image of the space; and determining, from a distribution of heating rates associated with the plurality of pixels of the thermal image, a heating-rate threshold segment the food item in the space from the food item's environment by, for each of the plurality of pixels in the thermal image, identifying the pixel as associated with the food item or as associated with the food item's environment based on a combination of (1) that pixel's associated temperature relative to the temperature threshold in the temperature distribution and (2) that pixel's associated heating rate relative to the heating-rate threshold in the distribution of heating rates.

11. The method of claim 1, wherein:

the temperature distribution comprises a multimodal distribution;

the temperature threshold comprises a plurality of temperature thresholds, each separating a particular pair of peaks in the multimodal temperature distribution; and the method further comprises identifying the pixel as associated with the food item or as associated with the food item's environment based on that pixel's associated temperature relative to at least one of the temperature thresholds in the temperature distribution.

12. The system of claim 10, wherein:

the temperature distribution comprises a multimodal distribution;

the temperature threshold comprises a plurality of temperature thresholds, each separating a particular pair of peaks in the multimodal temperature distribution; and the system further comprises one or more processors operable to execute the instructions to identify the pixel as associated with the food item or as associated with the food item's environment based on that pixel's associated temperature relative to at least one of the temperature thresholds in the temperature distribution.

13. The system of claim 10, further comprising the cooking apparatus, wherein:

the cooking apparatus comprises a microwave; and the microwave comprises the one or more processors and the non-transitory computer readable storage media.

14. The method of claim 1, wherein segmenting the food item based on the combination comprises segmenting the food item based on a weighted combination of (1) that pixel's associated temperature relative to the temperature threshold in the temperature distribution and (2) that pixel's associated heating rate relative to the heating-rate threshold in the distribution of heating rates.

15. The method of claim 14, wherein each weight in the weighted combination is based on a certainty associated with either that pixel's associated temperature relative to the temperature threshold or with that pixel's associated heating rate relative to the heating-rate threshold.

16. The media of claim 9, wherein segmenting the food item based on the combination comprises segmenting the food item based on a weighted combination of (1) that pixel's associated temperature relative to the temperature threshold in the temperature distribution and (2) that pixel's associated heating rate relative to the heating-rate threshold in the distribution of heating rates.

17. The media of claim 16, wherein each weight in the weighted combination is based on a certainty associated with either that pixel's associated temperature relative to the temperature threshold or with that pixel's associated heating rate relative to the heating-rate threshold.

18. The system of claim 10, wherein segmenting the food item based on the combination comprises segmenting the food item based on a weighted combination of (1) that pixel's associated temperature relative to the temperature threshold in the temperature distribution and (2) that pixel's associated heating rate relative to the heating-rate threshold in the distribution of heating rates.

19. The system of claim 18, wherein each weight in the weighted combination is based on a certainty associated with either that pixel's associated temperature relative to the temperature threshold or with that pixel's associated heating rate relative to the heating-rate threshold.

20. The system of claim 13, wherein the cooking apparatus further comprises a geometric thermal pattern on an interior of the cooking apparatus.

* * * * *